Jan. 28, 1964 V. W. HAMPTON ETAL 3,119,349
TRACK-MOUNTED TRANSPORT MEANS OR SYSTEMS
Filed May 3, 1960 9 Sheets-Sheet 1
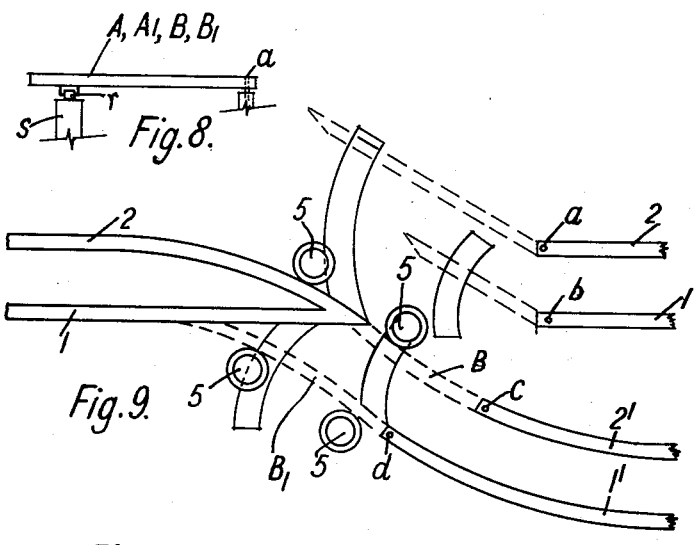
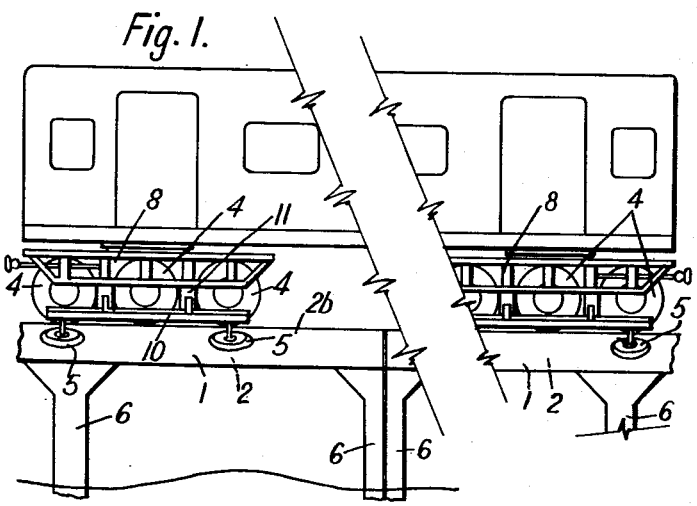
Inventors
V. W. Hampton
N. H. F. Renwick
G. D. Green
By
Wenderoth, Lind & Ponack
Attorneys

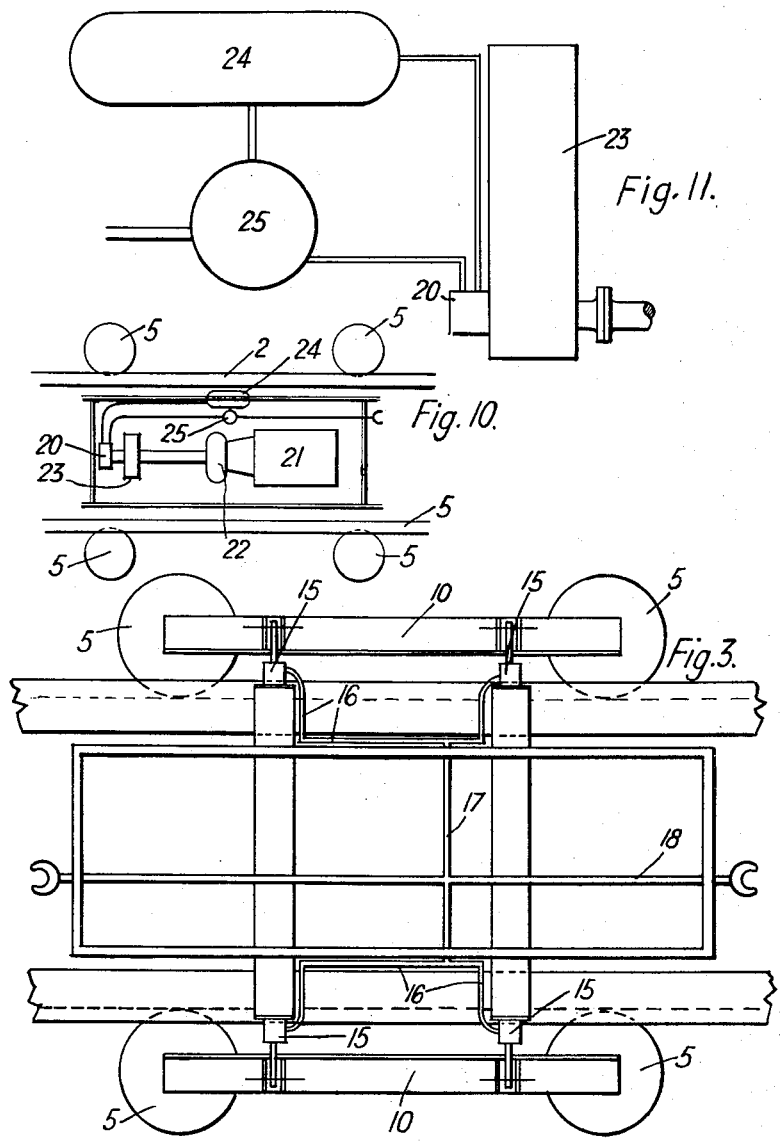

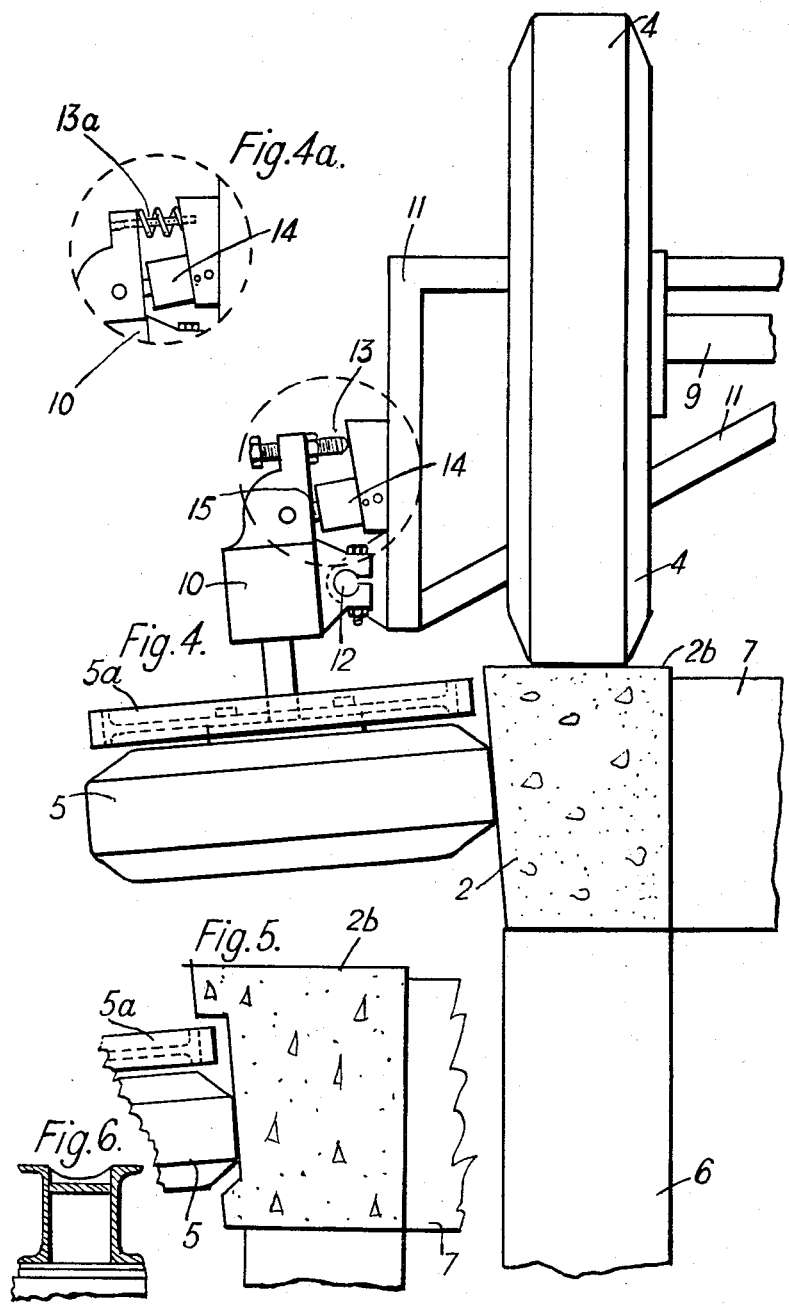

Jan. 28, 1964 V. W. HAMPTON ETAL 3,119,349
TRACK-MOUNTED TRANSPORT MEANS OR SYSTEMS
Filed May 3, 1960 9 Sheets-Sheet 5
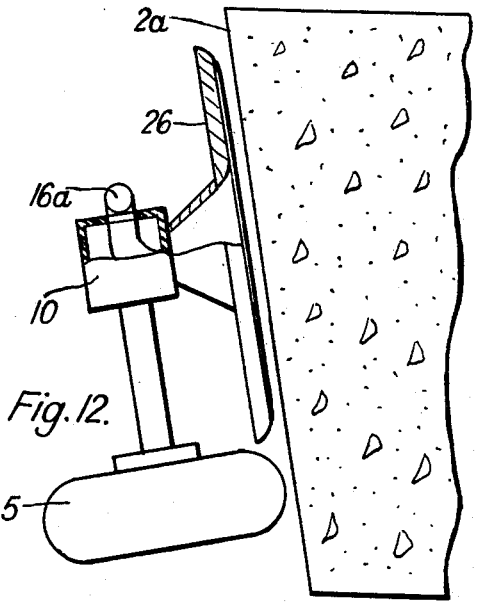
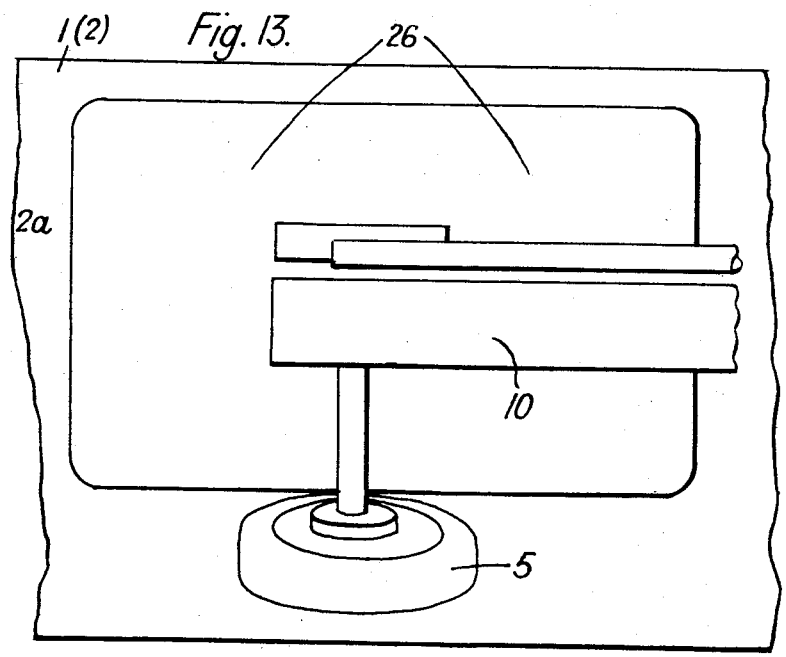
Inventors
V. W. Hampton
N. H. F. Renwick
G. D. Green
By
Wenderoth, Lind & Ponack
Attorneys Jan. 28, 1964 V. W. HAMPTON ETAL 3,119,349
TRACK-MOUNTED TRANSPORT MEANS OR SYSTEMS
Filed May 3, 1960 9 Sheets-Sheet 6

Verner W. Hampton,
Norman H.F. Renwick and
George D. Green
INVENTORS

BY Wenderoth, Lind & Ponack
ATTORNEYS

Jan. 28, 1964  V. W. HAMPTON ETAL  3,119,349
TRACK-MOUNTED TRANSPORT MEANS OR SYSTEMS
Filed May 3, 1960  9 Sheets-Sheet 8

AIR PRESSURE OPERATED VANES

ANEMOMETER OPERATING GOVERNOR AND SERVO VALVE

*Verner W. Hampton,
Norman H.F. Renwick and
George D. Green*
INVENTORS

BY *Wenderoth, Lind & Ponack*
ATTORNEYS

Jan. 28, 1964　　　V. W. HAMPTON ETAL　　　3,119,349
TRACK-MOUNTED TRANSPORT MEANS OR SYSTEMS
Filed May 3, 1960　　　　　　　　　　　　　9 Sheets-Sheet 9

*Verner W. Hampton,*
*Norman H.F. Renwick and*
*George D. Green*
INVENTORS

BY *Wenderoth, Lind & Ponack*
ATTORNEYS

United States Patent Office 3,119,349
Patented Jan. 28, 1964

3,119,349
TRACK-MOUNTED TRANSPORT MEANS OR SYSTEMS
Verner W. Hampton, Norman H. F. Renwick, and George D. Green, Salisbury, Southern Rhodesia, assignors to Pneuways Development Company (Private) Limited, Salisbury, Southern Rhodesia, a company of Southern Rhodesia
Filed May 3, 1960, Ser. No. 26,611
Claims priority, application Rhodesia and Nyasaland May 13, 1959
26 Claims. (Cl. 104—243)

This invention relates to the class of track mounted transport means or systems in which pneumatic or other rubber or resilient wheeled vehicles, or trains containing such, are run upon surfaces presented by spaced parallel rail-like running tracks, and other rotational elements adapted to make running engagement with side surfaces of the tracks are provided instead of flanges of the load-carrying wheels for retaining and properly locating the latter on the tracks.

The invention is concerned more particularly with the adoption of the foregoing means or systems in the provision of a transport system of low capital cost and adaptability as regards speeds and loads suitable "inter alia" for opening up districts where financial justification for conventional railways or major roads is not warranted. As will be understood from the following description, the invention comprises in part a combination of orthodox railway and road methods of transport, although it is not designed to replace or compete with existing rail and transport systems, being intended rather to supplement such systems already in existence or to provide a relatively inexpensive and satisfactory link in areas not at present served by any form of transport and where the cost of providing and maintaining presently conventional transport facilities would be uneconomic. The invention also aims at providing an answer to the problem of providing transport of population from peri-urban or dormitory areas to their working centers, where, at peak periods, roads are already congested beyond tolerable limits and it is not economically feasible to extend the boundaries of the areas given over to roads in major cities.

Furthermore, as will also be understood from the following description, the invention is especially concerned with constructional features of the track and of the vehicles with the important object of providing a high factor of safety in the running of the vehicles at high speeds and with the maximum comfort for passengers, obtained by smooth running, safe negotiation of track curves at speed and so on, all such advantages being obtained economically as to both initial and running costs.

The invention, so far as it concerns the running tracks, consists chiefly in the provision of twin parallel rail-like beams, offering both resistance to wear and a high coefficient of friction with the rubber-tired load-carrying vehicle wheels. The track forming beams are supported preferably only a sufficient height above ground level to enable the rotational elements or guide wheels which occur below the level of the track surfaces safely to clear the ground, or they are supported at variously elevated positions. They are conveniently held in their correct parallel spaced relationship by cross ties.

The cross-section adopted for the track beams may vary, but it is always made such that each track beam presents for the aforementioned other rotational elements an upwardly and outwardly sloped running surface substantially normal to the planes of rotation of such elements, which, when in running engagement with such track surfaces, incline upwardly and inwardly towards the center line of the track and are relied upon to guide and retain vehicles laterally on the track. The track beam cross-section may provide a recess extending along the beam, which recess contains the running surface for the said other rotational elements.

Points or switching in a track system according to this invention may be provided for by two pairs of pivotally mounted track-forming parts which are all pivotally mounted by their corresponding ends adjacent to two pairs of track-forming beams, the pivoted track-forming parts on a loop track being of curved shape, whereas those on the main track are of straight construction. The free ends of all the pivotally mounted track-forming parts are obliquely shaped for complementary engagement alternatively with the main track and loop beams while one of the main track-forming beams has a curved end curving towards and connected on to the end of its adjacent parallel track-forming beam, such connecting end being positioned forwardly of the region where curvature commences.

It is in the case more especially of track beams which serve as swinging parts of such points or switching system, that the beams are preferably fabricated from suitable steel sections, e.g. parallel spaced channel irons interconnected by their bottom flanges or otherwise rather than being made from concrete which is eminently suitable for the main runs of track, and cheaper.

Insofar as the invention concerns the locomotive and other vehicles themselves, whether prime mover units or trailers, they are supported on bogies presenting, as to each of them, preferably three load-bearing axles.

Each prime mover may present a single bogie in order to obviate excessive angularity in drive shafts. Load-carrying trucks or trailers are preferably mounted on two bogies of three load-bearing axles each.

The rotational elements or guide wheels which can run against outside sloping or recessed surfaces of the tracks are, like the load-carrying wheels, pneumatic- or other rubber-tired, and their disposition to the outsides of the load-carrying rail beams simplifies and facilitates the construction work, maintenance and inspection. The invention, and particularly the arrangement and means of connecting the guide wheels with the respective bogies, enables provision to be made for easy removal of the guide wheels so as to enable a truck, locomotive or the like if desired to be used as an ordinary road transport vehicle, on its own load-bearing wheels, as hereinafter more fully explained.

The invention also consists in a rail transport system of the class referred to above and more especially including vehicles having associated with the load-supporting bogies additional rotational elements or guide wheels, the grip of which against the outside surfaces of the track beams is resilient. Such resilience may be obtained with the aid of spring means interposed between the said elements and the bogies, such grip affording a safety factor which is essential for the satisfactory running in this class of transport system, wherein high running speeds are contemplated. With the object of achieving the aforesaid safety factor and obtaining still greater stability of the vehicle or train, this invention also provides for automatically adjusting the lateral grip of the aforesaid other rotational elements or guide wheels on the track sides to meet and resist the variable side and other loads tending to displace the vehicles from the tracks, which loads vary, "inter alia," in generally direct proportion with travelling speed and/or sharpness of track curvatures negotiated. Such automatic adjustment of the grip can be achieved by the provision of the vehicles with servo-means devised and arranged for varying the side-pressure of the rotational elements or wheels on the track side, such variation being brought about by control of the servo-means by a member or members moveable responsively to vehicle track speeds and/or centrifugal forces associated therewith at changes of track direction.

The servo-means, controlled generally as aforesaid, may operate on the guide wheels or the like, through any linkage adapted to increase or decrease, as appropriate, the force with which they are borne inwardly against the track sides. Such linkage may include, or be caused to operate, e.g. partially to rotate in either direction eccentric bushes for the several spindles or shafts of the guide wheels or the like, or alternatively to impart equivalent movements to beams or frames supporting the guide wheels.

The servo-means itself, may be of any suitable construction and may be operable from a compressed air service, e.g. a braking system, which may already be available on the vehicle or train, a suitable master-control being provided and also pressure-regulator means.

Pre-loading of the guide wheels through motor cylinders included in the servo-system may be provided for as by adjusting the pressure regulator. For the control of the servo-system responsively to the forces aforementioned, e.g. for the operation of eccentric guide wheel bushes or beams any one or more of various devices of a known character may be used, which are themselves moveable in relation to the vehicle as a result of the vehicle speed and/or centrifugal force.

The servo-control may be operated from centrifugal governor means on a running wheel shaft or layshaft operatively associated therewith. Alternatively, a vane, aerofoil or the like so presented on the vehicle as to be subjected to air pressure or windage varying proportionately with the vehicle speed, and yieldable against such pressure in relation to a swivel or other mounting, may be linked suitably with the servo valve for regulating the guide wheel pressure automatically to the vehicle speed.

The above alternatives for controlling the servo-means cater only for correlating guide wheel side grip with vehicle speed. The correlation of such grip also with centrifugal forces tending to topple a vehicle or train laterally from the track, can be provided for by connecting the servo-control valve with pendulum or other such means, suitably mounted on a bogie, or elsewhere, on a vehicle, so that its movement laterally of the path of the vehicle in either sense in response to such forces, can be transmitted to the servo valve and the guide wheel grip increased or varied proportionately to such forces. Such centrifugally-sensitive and responsive servo control may, if desired, be integrated through a common linkage with any speed-sensitive or -responsive servo control so as to obtain further increase of the safety factor, enabling stretches of track containing sharp curves to be traversed safely at higher speeds than would otherwise be permissible.

In certain applications of this invention and more particularly where the vehicles or trains are running at very high speeds, the aforementioned other rotational elements or guide wheels, which may be relatively small, when running in engagement with the side surfaces of the track means may attain higher speeds than desirable. Such an undesirable feature or occurrence can be overcome, according to the invention (while the other rotational elements or guide wheels may conform in their general arrangement and disposition with respect to the vehicles as indicated above) by so providing that, more particularly at the higher speeds, they do not actually make contact with the track beams. They may, accordingly, provide in the ordinary way only a reserve safety feature so far as concerns their actual contact with the track beams.

More particularly the bogies or the like at the outsides of which the rotational elements or guide wheels are provided may be controlled laterally by compressed air jets or the like directed on to the sides of the track beams.

Such jets or the like, which may be delivered by flared nozzles may be disposed near to the rotational elements or guide wheels and so designed that, as the clearance between the faces of the nozzles and the track beams decreases, e.g. when corners or curves are being negotiated at speed, compressed air reaction to such decrease will be augmented, so that a corrective action will result, keeping the vehicles centralized on the tracks, the rotational elements or guide wheels making contact with the latter only in exceptional circumstances.

The compressed air jets may be produced and correctly directed by any suitable means and/or their effectiveness for the foregoing purpose may, if desired, be increased with the assistance of aerofoil shrouding or like means adapted to make, for jet creation and/or augmentation, use of windage arising from the forward speed of the vehicle, more especially at high speeds. Such aerofoil shrouding, or equivalent means, may be associated with the vehicle bogies and/or rotational elements or guide wheels. Furthermore, servo-means may be devised and arranged for varying jet pressure on the track beam sides, such variation, like that which may be applied for side grip or guide wheels on the track beams, being brought about by control of servo-means responsively to vehicle track speeds, to centrifugal forces associated with such speeds and/or to changes of track direction, with or without the influence of windage pressures experienced by the front of the vehicle or train when in motion.

In the accompanying drawings, which are given by way of example only:

FIGURE 1 is a small scale side elevation of a vehicle in running position on a track, both according to this invention;

FIGURE 3 is a semi-diagrammatic plan of bogie parts, comprising "inter alia" the means for locating the vehicle on the track;

FIGURE 4 is a still larger scale fragmentary part-sectional elevation showing how a guide-wheel is mounted and cooperates with a track beam side surface, and some details;

FIGURE 4a shows an alternative detail to that encircled by the dotted line in FIGURE 4;

FIGURE 5 is a fragmentary view showing a track beam of alternative cross-section;

FIGURE 6 is a reduced scale sectional view of a box-section steel fabricated track beam;

FIGURES 7 and 9 are diagrammatic plan views illustrating track-switch construction and mode of operation;

FIGURE 8 is an elevation illustrating how moveable rail means may be supported for switching movements;

FIGURE 10 is a diagrammatic plan showing an arrangement of air compressor and associated apparatus included in a prime mover vehicle unit;

FIGURE 11 is a fragmentary enlarged view of certain apparatus appearing in FIGURE 10;

FIGURE 12 is a fragmentary view showing a guide-wheel associated with a device for directing compressed air against a track beam side surface;

FIGURE 13 is a side elevation corresponding to FIGURE 12;

FIGURE 20 is an end elevation of a vehicle illustrating, with

Figure 21:
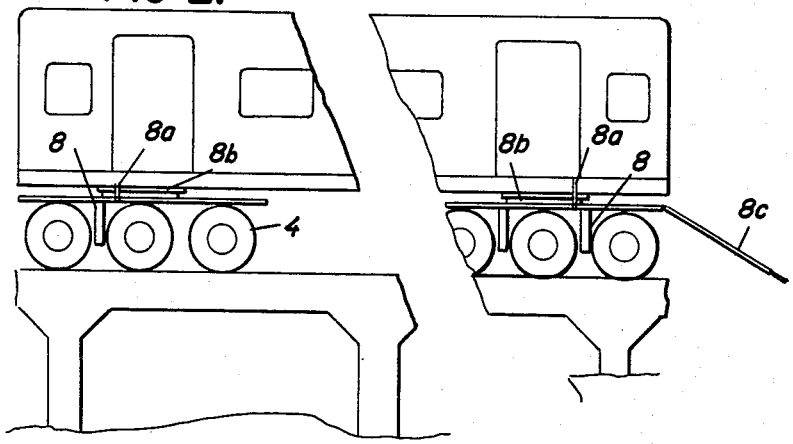
Figure 22:
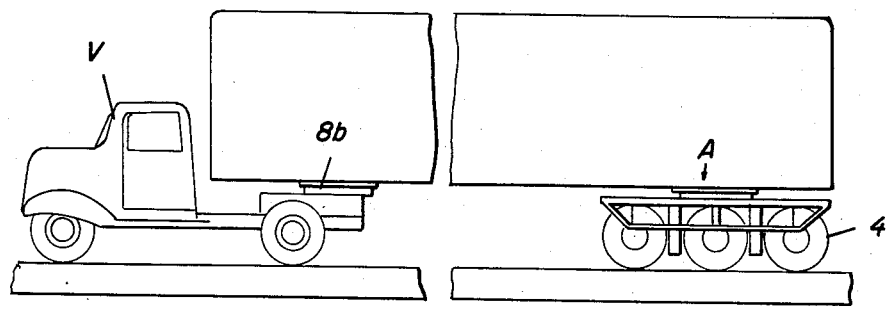

FIGURES 21 and 22, which are side elevations, the conversion of such a vehicle for road haulage.

The principal features of the invention are now further described.

(A) *Trackway*

(See FIGURES 1, 2, 4 to 9)

The preferred track consists of a pair of beams 1, 2, of any suitable construction, each beam being approximately rectangular in cross-section but having the outer face as 2a provided with an outward batter or inclination some few degrees from the vertical. The beams are laid parallel so that the distance between their outer faces is kept to a constant suitable gauge, 6 feet being a convenient dimension.

The top face 2b of the beams is used as the running surface for the main load-carrying wheels as 4.

The guide-wheels as 5 which retain the vehicle in its proper course run on the sloped outer face 2a of the beams and are set, as shown, at an angle to the horizontal in order to present the wheel normal to the face of the beam.

Figure 2:
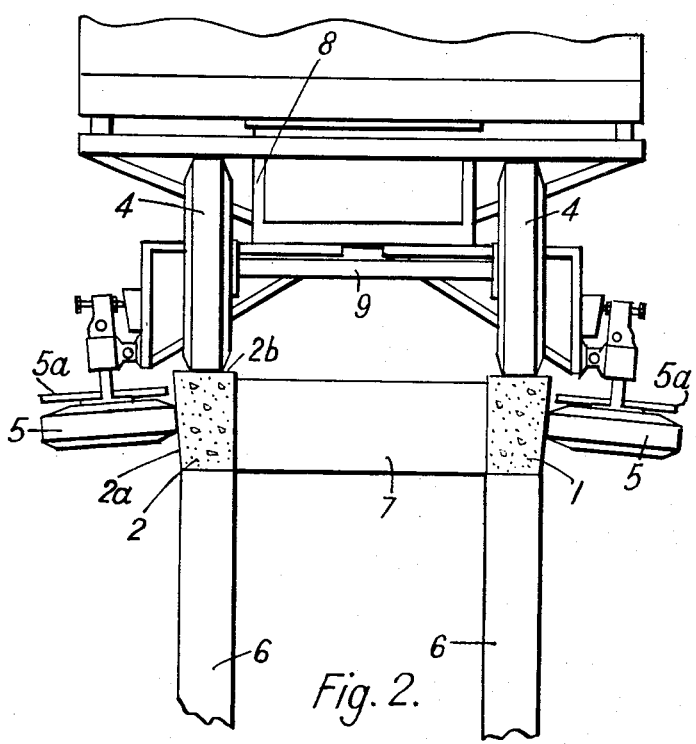
FIGURE 2 is a larger scale end elevation of such vehicle and track, showing in greater detail the means for locating the running wheels laterally on the track.

As most clearly apparent from FIGURE 1, the beams are carried clear of the ground, varying from a few inches to any desirable height, by means of bored or driven reinforced concrete piles or piers 6 of desired section spaced at suitable intervals according to the loads to be catered for. Each pair of piles as 6 in FIGURE 2 is cut off or otherwise brought to a desired level and capped by means of a concrete or metal lintel 7 to which the beams are fixed by holding down bolts or other means, and packed to level or grade.

The use of piles allows for gradients to be reduced or even eliminated in normal undulating country simply by extending the carrying piles to a suitable level when crossing depressions.

Similarly, this method of construction can be utilized in built-up areas as an elevated system carried along the verges of roads, astride sidewalks or above center islands, allowing unhindered passage of normal vehicular traffic underneath.

Figure 7:
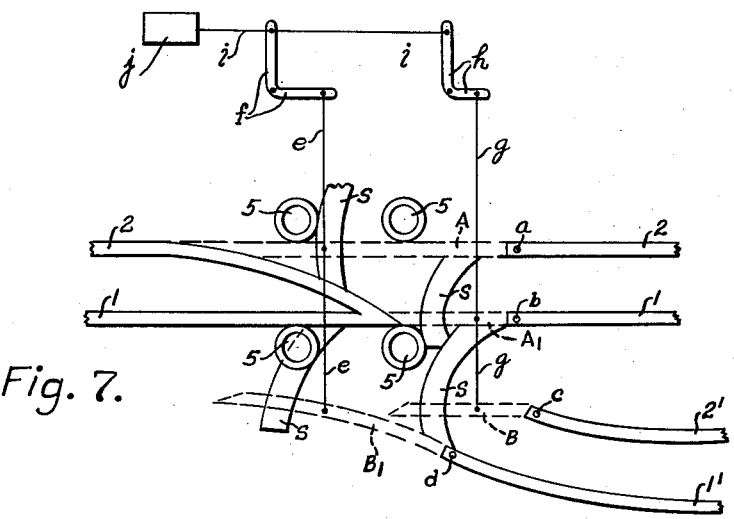

The method employed for switching vehicles between parallel tracks and the essentials of construction and co-operation of fixed track and moveable switching track parts, have been outlined above and are illustrated in FIGURES 7, 8 and 9. Owing to difficulties in curvature and weights, beams A, A1, B and B1, which are pivotable at points a, b, c, d, and supported as in FIGURE 8 by rollers running on quadrant tracks as s, are preferably manufactured of steel in hollow box sections as in FIGURE 6. As indicated in FIGURE 7, beams A and B1 may be coupled together as by means of suitable rodding e to a bell crank f; similarly beams A1 and B are coupled together by rodding g to a second bell crank h. In their turn the two bell cranks are coupled together as by means of rodding i to a throw-over lever, reversible electric motor, or other such means denoted by reference j. When such means is operated, beams A and A1 are swung to one side leaving spaces for the guide wheels to pass through. At the same time beams B and B1 are swung across until they meet the main beams, to complete the switching as in FIGURE 9.

(B) *Vehicles*

(See FIGURES 1 to 4a, 10 and 11)

The prime mover and load-carrying vehicles comprise, as shown in several of the figures, one or more (interconnected) free-swinging bogies 8, each with three axles 9 fitted with the selected pneumatic load-carrying wheels 4, and surmounted by suitable bodies. The pneumatic tires at normal maximum loading will be of a size that can continue to work with the additional weight put on the remainder or one side in the event of a burst or puncture occurring in one of them. The bogies run along the top surfaces as 2b of the track beams and are guided by, and the vehicles retained on the track by means of the two pairs of smaller diameter pneumatic tired wheels 5 mounted as shown in FIGURES 2 and 4 and supported by means of box girders as 10 slung parallel to the bogie frames. Such box girders are attached one along each side of the main bogie underframes at two or more points by means of the triangular members 11 and are free to pivot by means of the trunnion pins 12. The initial pressure of the guide wheels against the beam sides may be pre-set by means of the limiting stops as 13 and thereafter the control of this pressure may be exercised by the pneumatic motor cylinders and rams, as 14 and 15 in FIGURE 4. In the alternative detail illustrated in FIGURE 4a, in addition to the resiliency of grip of the guide wheels obtainable from the motor cylinders and rams system and the resiliency of the tires themselves, springs as 13a may be included to apply, independently of or supplementary to the pneumatic system, an initial or minimal grip to the guide wheels.

Figure 19:
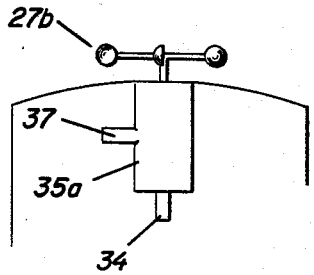

All the pneumatic cylinders as 15 throughout the train of vehicles are connected, by means of suitable flexible pipes, as 16, 17 and 18 in FIGURE 3, and 19 in FIGURE 10, to a common air compressor 20 driven off the primary drive of the towing vehicle, e.g. the main engine 21, torque converter 22 and transfer gear box 23. The pressure at which the air is compressed in the reservoir vessel 24 and distributed as from 25 to the various cylinders 15 in the train is therefore in direct proportion to the speed of the train and consequently the higher the speed the greater the pressure in the cylinders and higher the bearing pressure of the guide wheels 5 inwardly on the track beams with resultant increase in safety. It follows also that in peculiar conditions such as extreme side winds, the initial pressure of the cylinders can be controlled by a simple adjustment, under the driver's control, to the blow-off pressure valve of the compressor 20.

The elements 5a shown in some of the figures are simple wheels, preferably rubber-tired, which can engage the track beam sides only in certain circumstances, as for instance when the associated guide wheel pneumatic tire bursts or is underinflated.

Referring to FIGURES 12 and 13, the element 26 is a compressed air-fed flared nozzle associated with a guide wheel 5 for application of an air jet to the outside of a track beam, for centralizing the bogie on the tracks without reliance upon contact of such guide wheel with the track beam, as explained in the foregoing general description. Compressed air feed to such nozzles may be by pipe 16a leading through the guide wheel-carrying box girder, which latter in such a construction may or may not be made adjustable in position in relation to the respective bogie frame. Any desired means may be provided for setting the face of the nozzle with correct clearance from the track-beam side.

Figure 15:
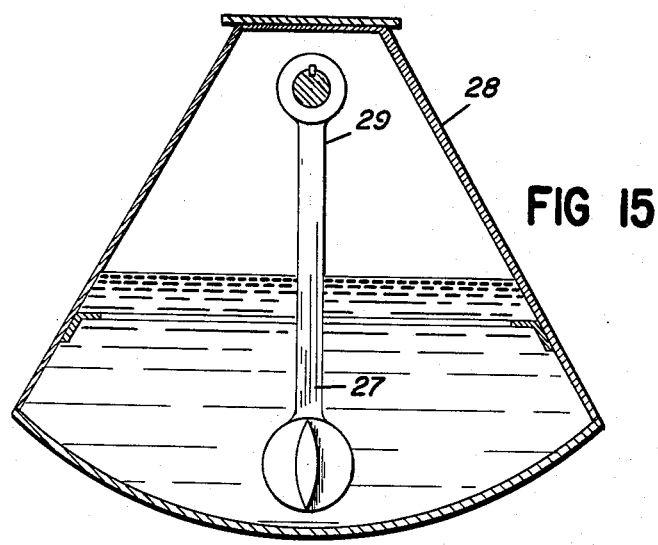
FIGURE 15 is an end view of a pendulum device included in FIGURE 14.
Figure 14:
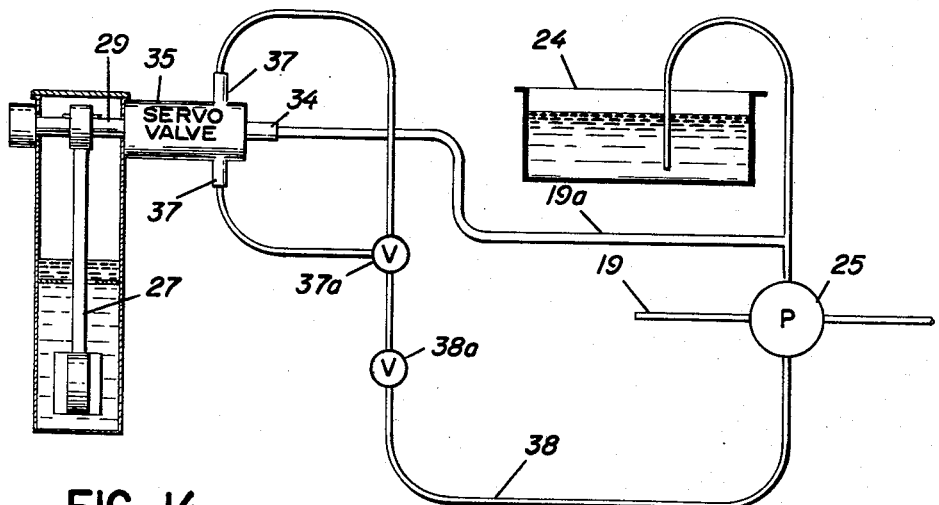
FIGURE 14 is a semi-diagrammatic view of a means for obtaining guide-wheel grip control in relation to both speed and centrifugal effects on the vehicle.

Referring now to FIGURES 14 and 15, whereas in FIGURES 10 and 11 item 25 serves essentially as a point from which fluid pressure, increasing and decreasing with the speed of operation of the compressor or pressure generator 20 and thus also with the speed of travel of the vehicle, is distributed via the line 19 to motor cylinders cooperating with the guide wheels, the said item 25 is in this example a pressure-regulating slave valve controlled by a servo motor means which is in turn actuated responsively to displacements in a transverse plane of the vehicle generated by centrifugal forces upon a pendulum while the vehicle is negotiating track curvatures. In FIGURES 14 and 15 the pendulum 27, suspended within a casing 28 containing oil for damping its oscillations, angularly displaces its suspension shaft 29 in either sense proportionally to the centrifugal force at any time obtaining.

Figure 16:
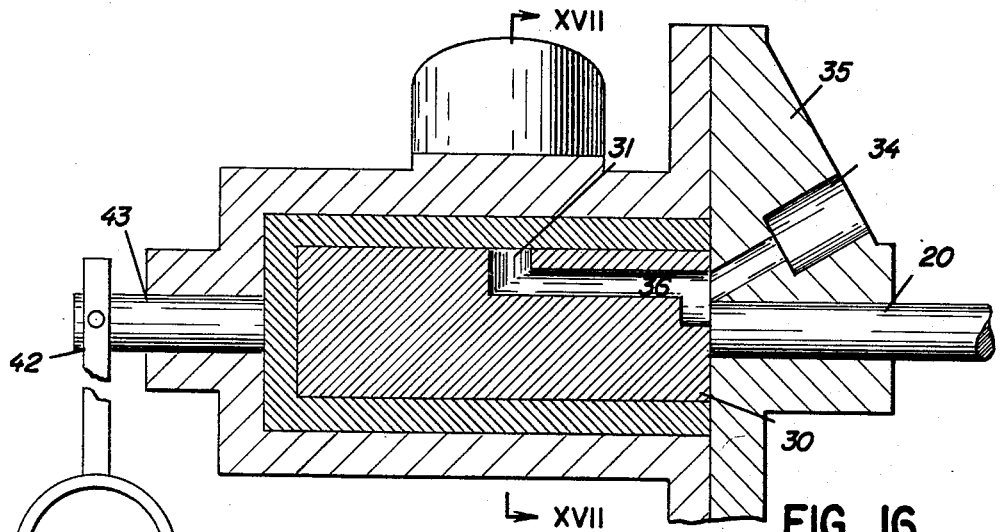
FIGURE 16 is a longitudinal section of a servo-valve included in the system of FIGURE 14.
Figure 17:
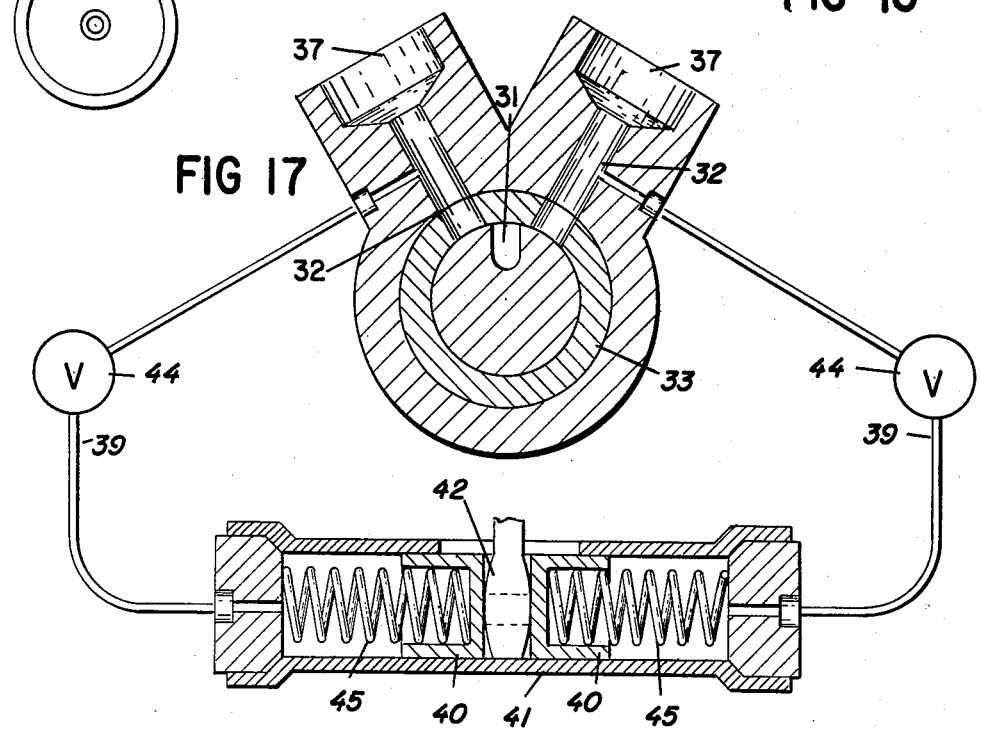
FIGURE 17 is a cross-section on line XVII—XVII of FIGURE 16, showing certain associated mechanism.

As shown in FIGURES 16 and 17 the shaft 29 is connected to the inner member 30 of a servo valve of the rotary type through a port 31 and either of the two ports 32 in a sleeve 33 with which the port 31 may be aligned, fluid admitted from the reservoir 24 at all times to the port 31 under pressure through line 19a, an inlet 34 in the valve body 35 and passage 36 may pass through either of the body outlets 37.

Pressure from the reservoir 24 obtaining at any time in either of these outlets 37 is applied through the common line 38 so as to regulate the valve 25 to boost the fluid pressure as distributed from the slave valve 25 to the motor cylinders and thus to increase the guide wheel grip.

The relative positions of the ports 31 and 32 as shown in FIGURES 16 and 17 corresponds to the condition when no centrifugal force acts on the pendulum and the guide wheel grip is a function only of the speed of the vehicle. When centrifugal force acts either way on the pendulum to cause port 31 to overlap with a sleeve port 32 fluid pressure is increased in the line 38, with the effect aforesaid. Such pressure, however, is also applied through lines 39 to the backs of opposed pistons 40 operating in the body 41 of a slave cylinder about the end of an arm 42 to rock the latter and through the shaft 43 to turn the ported sleeve 33 of the servo valve one way or the other to move its ports 32 out of line with the port 31 and the outlets 37 with one or other of which latter the port 31 has been connected, in the result isolating the line 38 from the pressure fluid supplied by the inlet 34. A double reflex valve and a bleed valve included respectively at points 37a and 38a serve respectively to differentiate the pressure conditions obtaining in the opposite ends of the slave cylinder 41 and to release pressure from both lines 39 for return of the servo valve to the initial setting with the pendulum hanging free. Valves included at 44 in the lines 39 enable the times of closing of the sleeve ports 32 to be regulated; and centralizing springs 45 operating between the pistons 40 and the respective ends of the slave cylinder serve to centralize the arm 42 and thus return the sleeve to its central position for co-action with the port 31 when the latter is next moved under the effects of centrifugal force on the pendulum.

Figure 18:
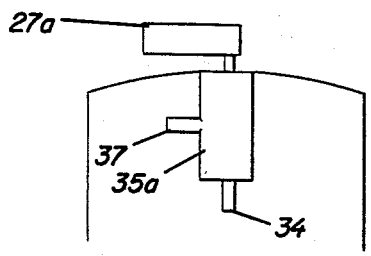
FIGURES 18 and 19 are fragmentary views showing alternative means of controlling guide-wheel grip in relation to vehicle speed.

Control of guide wheel grip in relation to vehicle speed by direct action of air pressure met by the advancing vehicle is obtainable alternatively as shown in FIGURE 18 by using an air pressure operated vane as 27a mounted outside a vehicle and coupled to a spring-centered version 35a of the servo valve 35 included in FIGURE 14 and such as may if desired be operatively coupled with such centrifugally sensitive servo-valve 35 to control the fluid pressure affecting guide-wheel grip.

In the further alternative arrangement shown in FIGURE 19, the servo-valve 35a of FIGURE 18 is driven instead by an anemometer 27b via a centrifugal governor (not shown).

Figure 20:
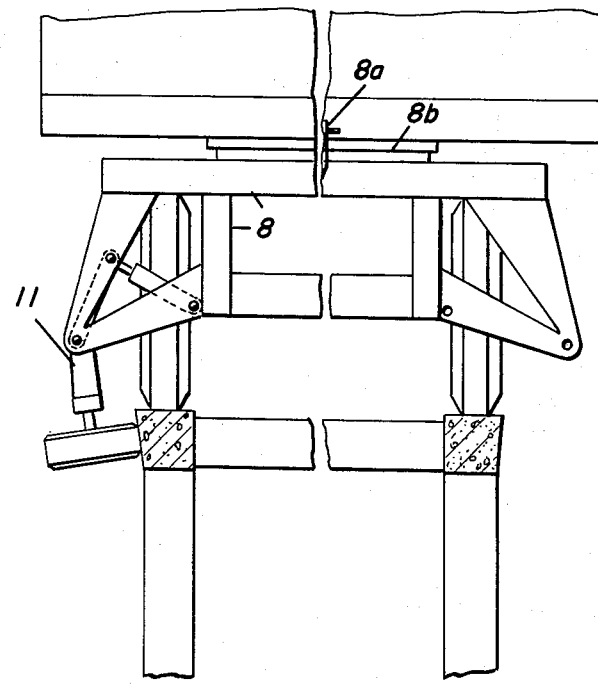

Provision is included, if desired, for trailing vehicles of the system to be adaptable to run alternatively on good, smooth road surfaces, and this without adding objectionably to the cost and tare weight of such vehicle. Thus, as illustrated in FIGURES 20, 21 and 22 guide wheel-carrying assemblies are removed by release of the carrying members 11 at their points of attachment to the bogie under frames 8, with provision for locking the bogies at the same time in fore-and-aft position as by lock pins 8a inserted through suitably positioned holes in the bogie turntables 8b. With the bogies thus locked the vehicle, as in FIGURE 21, can be coupled in generally known way as by a trailer bar 8c to a towing vehicle. Alternatively, referring to FIGURE 22, the weight of the front end of the vehicle to be coupled to a mechanical horse type of towing vehicle as V in FIGURE 22 may be supported on hydraulic jacks or otherwise while the complete front bogie assembly is rolled out of the way and the towing vehicle V backed into place and coupled as by a standard articulated-vehicle coupling, whereby the whole unit may become a normal articulated road unit of a known and widely used character.

(C) Maintenance

In the case of the track, if this is constructed of concrete, the amount of maintenance required is negligible, being largely confined to replacement of the aforementioned bitumastic or other wearing tread surface.

In the case of motive power units and trailer units, since these may utilize heavy transport vehicle sub-assemblies, no maintenance factors arise which are not normally encountered in the operation of any road-haulage business, and repairs can therefore be carried out in any suitably equipped workshop in the trade, units being deliverable by road on their own wheels, as above explained.

(D) General

Apart from the advantages arising from a transport system or means of the type with which this invention is concerned, such as arise from the absorption or prevention of the generation of shocks and vibrations, and the silence of running on account of the use of pneumatic or other resilient tires on both the load-carrying and the guide wheels, not to mention the lightweight vehicle construction which can be adopted in view of the increase of adhesion resulting from the use of rubber-tired wheels running on concrete or bituminised surfaces whereby more rapid acceleration and harder braking are possible compared with those which are possible in the case of steel-wheeled vehicles running on steel rails, the invention adequately meets the paramount requirements of passenger comfort and safety. Thus, in the system or means described, apart from providing for increase of guide wheel pressure on the sides of the track beams with speed increases, it is a simple matter to provide for adjustment of air pressures in the respective tires throughout the train, for inflation or deflation of selected tires and this while the train is in motion, provisions which may include pressure-ascertaining manometers; and where metallic cord tires are used the safety factor is greatly increased above that of conventional natural or synthetic cord tires, whereby the rate of tire wear may be substantially reduced.

In addition to the safety aspect of the provisions made according to this invention, silence of running can be assured thereby and passenger comfort greatly improved over other transport systems.

Having now particularly described and ascertained our said invention and in what manner the same is to be performed we declare that what we claim is:

1. In a transport system an assemblage of twin parallel spaced track beams with upper surfaces thereof presenting a running track suitable for flangeless wheels, means supporting said beams above ground at desired elevations, a vehicle having resilient-tired load-carrying wheels adapted to run on said upper surfaces and a body supported above the beams on at least one free-swinging bogie; the said beams having such cross-section as to present surfaces to the opposite sides of the assemblage which surfaces diverge upwardly; the vehicle having associated with the said bogie on opposite sides thereof and to the outsides of said load-carrying wheels further resilient-tired wheels adapted, for the purpose of guidance of the vehicle, to make running engagement inwardly with and exert resilient grip on the respective adjacent divergent beam surfaces in planes of rotation substantially normal thereto.

2. In a transport system as claimed in claim 1 said vehicle bogie having three load-bearing wheel axles.

3. In a transport system as claimed in claim 1 said vehicle being a prime mover and supported solely by a single bogie.

4. In a transport system as claimed in claim 1 said vehicle being a trailer and supported solely by two bogies.

5. In a transport system as claimed in claim 1 said surfaces which diverge upwardly being contained in recesses formed along the rail-like beams by which they are presented.

6. In a transport system as claimed in claim 1 said further wheels adapted to engage and exert resilient grip on said track beam surfaces being supported by girder means slung parallel to sides of said bogie.

7. In a transport system as claimed in claim 6 said girder means being pivotally connected to said bogie.

8. In a transport system as claimed in claim 1 spring means operatively interposed between the bogie and the further wheels to generate said resilient grip.

9. In a transport system as claimed in claim 1 fluid pressure actuated motor means operatively interposed between the bogie and the further wheels to generate, and vary the intensity of, said resilient grip.

10. In a transport system as claimed in claim 8 means for pre-setting initial gripping pressure of said further wheels on said rail sides.

11. In a transport system as claimed in claim 9 means for pre-setting initial gripping pressure of said further wheels on said rail sides.

12. In a transport system as claimed in claim 9 means supplying fluid pressure to said motor means and means for varying such fluid pressure proportionately with track speed of the vehicle.

13. In a transport system as claimed in claim 12 said fluid pressure varying means including servo valve means operative responsively to such track speed.

14. In a transport system as claimed in claim 13 a fluid pressure line serving a plurality of said motor means, said servo means controlling pressure in said line.

15. In a transport system as claimed in claim 13 means on the vehicle laterally movable with respect thereto responsively to centrifugal forces, and means translating and co-integrating movements of said laterally movable means into movements of said servo valve means augmentative of said fluid pressure.

16. In a transport system as claimed in claim 14 means on the vehicle laterally movable with respect thereto responsively to centrifugal forces, and means translating and co-integrating movements of said laterally movable means into movements of said servo valve means augmentative of said fluid pressure.

17. In a transport system as claimed in claim 1 compressed air jet nozzle means associated with said bogie and directed at while spaced from said rail side surfaces adjacent said further wheels, said air jet nozzle means and said further wheels being supported for movement together in relation to the bogie.

18. In a transport system as claimed in claim 17 means generating air under pressure for said jet nozzle means and means for increasing such air pressure with track speed increase, to the extent of moving said further wheels out of running contact with said rail side surfaces at high track speeds.

19. In a twin-beamed track for vehicles having guide wheels adapted to run against outside surfaces of the track presented by the respective beams, a switch between a main track and a loop track, said switch comprising a first pair of track forming members connected pivotally at their corresponding ends respectively to two rails of the main track and movable laterally between an operative position in which they form a continuous part of the main track and an inoperative position leaving space for free passage of said guide wheels; a second pair of track forming members connected pivotally at their corresponding ends respectively to two tracks of the loop track and movable laterally, with and in the same senses as said first pair of rail-forming members, between an inoperative position permitting guide wheels to pass and a position in which they form a continuous part of the loop track, a pair of beams forming that part of the main track which approaches the switch including one track converging to join the other of that pair in the general direction of the loop track and the free ends of the respective pairs of switch-forming track members being obliquely shaped for complementary lateral engagement with the respective tracks of the switch-approach part of the main track when either of said pairs is moved into the operative position.

20. In a twin-railed track with switch included as claimed in claim 19, said pairs of switch-forming members being supported for simultaneous lateral swinging movements between their operative and inoperative positions by rollers running on quadrant tracks.

21. In a transport system including a vehicle as claimed in claim 1, said further resilient-tired wheels being carried by assemblies movably connected with said bogie and means being included for locking the bogie in a fore and aft position against free-swinging.

22. In a transport system including a vehicle as claimed in claim 1, said further resilient-tired wheels being movably connected with said bogie and locking pin means being included for locking said bogie in a fore and aft position.

23. In a transport system as claimed in claim 1, said bogie being interchangeable with and replaced by an articulated supporting coupling of a towing road unit.

24. In a transport system an assemblage of twin parallel beams with upper surfaces thereof presenting a running track suitable for flangeless wheels, means for supporting said beams in spaced relation to one another, a vehicle having load-carrying wheels to run on said upper surfaces, a body supported above said beams by said load carrying wheels; each of said beams having a cross-section with a surface inclined to said running track and guide wheels for guiding said vehicle oppositely mounted on said vehicle exerting a resilient grip on the respective adjacent inclined beam surfaces in planes of rotation substantially normal thereto.

25. In a transport system as claimed in claim 1, said track-like beams laid to present two twin-beam tracks, a switch for diversion of said vehicle from one track to the other, said switch comprising a first pair of track-forming members connected pivotally at their corresponding ends respectively to two track-forming beams of the one track and moveable laterally between an operative position in which they form a continuous part of said one track and an inoperative position leaving space for free passage of said guide wheels; a second pair of track-forming members connected pivotally at their corresponding ends respectively to two track-forming beams of the other track and moveable laterally, with and in the same directions as said first pair of track-forming members, between an inoperative position permitting guide wheels to pass and a position in which they form a continuous part of the other track, a pair of track-forming beams comprised in that part of said one track which approaches the switch including one track converging to join the other of that pair in the general direction of the other track and the free ends of the respective pairs of switch-forming track members being obliquely shaped for complementary lateral engagement with the respective track-forming beams of the switch-approach part of the one track when either of said pairs is moved into the operative position.

26. In a transport system as claimed in claim 24, said track-like beams laid to present two twin-beam tracks, a switch for diversion of said vehicle from one track to the other, said switch comprising a first pair of track-forming members connected pivotally at their corresponding ends respectively to two track-forming beams of the one track and movable laterally between an operative position in which they form a continuous part of said one track and an inoperative position leaving space for free passage of said guide wheels; a second pair of track-forming members connected pivotally at their corresponding ends respectively to two track-forming beams of the other track and movable laterally, with and in the same directions as said first pair of track-forming members, between an inoperative position permitting guide wheels to pass and a position in which they form a continuous part of the other track, a pair of track-forming beams comprised in that part of said one track which approaches the switch including one track converging to join the other of that pair in the general direction of the other track and the free ends of the respective pairs of switch-forming track members being obliquely shaped for complementary lateral engagement with the respective track-forming beams of the switch-approach part of the one track when either of said pairs is moved into the operative position.

References Cited in the file of this patent

UNITED STATES PATENTS

| | | |
|---|---|---|
| 328,679 | Hogsett | Oct. 20, 1885 |
| 1,000,009 | Jenison | Aug. 8, 1911 |
| 1,286,042 | McClure et al. | Nov. 26, 1918 |
| 1,341,249 | Widegren | May 25, 1920 |
| 1,602,066 | Burton | Oct. 5, 1926 |
| 1,630,930 | Feilers | May 31, 1927 |
| 1,854,487 | Ronk | Apr. 19, 1932 |
| 2,055,971 | Fraser | Sept. 29, 1936 |
| 2,162,351 | Main | June 13, 1939 |
| 2,503,120 | Meyer | Apr. 4, 1950 |
| 2,932,258 | Marquard | Apr. 12, 1960 |
| 2,977,893 | Rosenbaum | Apr. 4, 1961 |
| 3,055,312 | Jay et al. | Sept. 25, 1962 |

FOREIGN PATENTS

| | | |
|---|---|---|
| 34,007 | Austria | Aug. 10, 1908 |